US010732963B2

(12) United States Patent
Arms et al.

(10) Patent No.: US 10,732,963 B2
(45) Date of Patent: Aug. 4, 2020

(54) SYSTEM AND METHOD FOR AUTOMATICALLY MANAGING UPDATED UEFI VARIABLES

(71) Applicant: Dell Products, LP, Round Rock, TX (US)

(72) Inventors: Michael W. Arms, Pflugerville, TX (US); Justin L. Frodsham, Leander, TX (US)

(73) Assignee: Dell Products, LP, Round Rock, TX (US)

( * ) Notice: Subject to any disclaimer, the term of this patent is extended or adjusted under 35 U.S.C. 154(b) by 146 days.

(21) Appl. No.: 15/479,622

(22) Filed: Apr. 5, 2017

(65) Prior Publication Data

US 2018/0293061 A1  Oct. 11, 2018

(51) Int. Cl.
*G06F 9/44* (2018.01)
*G06F 8/658* (2018.01)
*G06F 8/654* (2018.01)
*G06F 8/65* (2018.01)
*G06F 11/14* (2006.01)
(Continued)

(52) U.S. Cl.
CPC ............ *G06F 8/658* (2018.02); *G06F 8/654* (2018.02); *G06F 8/66* (2013.01); *G06F 11/1402* (2013.01); *G06F 8/65* (2013.01); *G06F 8/71* (2013.01); *G06F 9/4401* (2013.01); *G06F 11/1464* (2013.01)

(58) Field of Classification Search
CPC .......... G06F 8/65–71; G06F 8/73; G06F 8/74; G06F 8/75; G06F 8/654–658; G06F 9/4401–4416; G06F 9/441; G06F 8/658; G06F 8/66; G06F 11/1402; H04L 67/34

USPC ........................................................ 717/172
See application file for complete search history.

(56) References Cited

U.S. PATENT DOCUMENTS 7,263,531 B2 *  8/2007  Venkatesan ............ G06F 8/658
7,805,420 B2    9/2010  Kapoor
9,104,544 B1    8/2015  Uchronski
(Continued)

OTHER PUBLICATIONS

Title: Too young to be secure: Analysis of UEFI threats and vulnerabilities, author: V Bashun et al, published on 2013.*

*Primary Examiner* — Chameli Das
(74) *Attorney, Agent, or Firm* — Prol Intellectual Property Law, PLLC; H. Kenneth Prol

(57) ABSTRACT

An information handling system operating an automated UEFI variable update management system may comprise a processor executing machine-readable executable code instructions of the automated UEFI variable update management system to save to a memory and execute a first plurality of UEFI variables included in a first terse executable image, to receive a second terse executable image including a second plurality of UEFI variables in a second preset order, wherein each of the first plurality of UEFI variables and the second plurality of UEFI variables including a variable value, and a variable key pointing to a variable value location in the memory, to compare the first plurality of UEFI variables to the second plurality of UEFI variables, to retrieve from the first terse executable image and store in a variable update map the first plurality of UEFI variables, to retrieve from the second terse executable image and store in the variable update map the second plurality of UEFI variables, and to store the variable update map to the memory.

20 Claims, 7 Drawing Sheets

(51) Int. Cl.
    *G06F 9/4401*     (2018.01)
    *G06F 8/71*     (2018.01)

(56) References Cited

U.S. PATENT DOCUMENTS

| | | | |
|---|---|---|---|
| 9,842,210 B2* | 12/2017 | Rose | G06F 21/57 |
| 10,019,253 B2* | 7/2018 | Vidyadhara | G06F 8/656 |
| 10,120,678 B2* | 11/2018 | Downum | G06F 8/654 |
| 2010/0274765 A1 | 10/2010 | Murphy | |
| 2014/0189336 A1* | 7/2014 | Ballesteros | G06F 21/575 |
| | | | 713/2 |
| 2014/0297999 A1* | 10/2014 | Kim | G06F 9/4401 |
| | | | 713/1 |
| 2015/0074387 A1* | 3/2015 | Lewis | G06F 21/575 |
| | | | 713/2 |
| 2015/0089209 A1* | 3/2015 | Jacobs | G06F 21/575 |
| | | | 713/1 |
| 2015/0199517 A1* | 7/2015 | Rose | G06F 21/57 |
| | | | 726/22 |
| 2017/0242686 A1* | 8/2017 | Vidyadhara | G06F 8/656 |
| 2018/0136928 A1* | 5/2018 | Downum | G06F 8/654 |
| 2018/0227391 A1* | 8/2018 | Zimmer | H04L 63/123 |
| 2018/0293061 A1* | 10/2018 | Arms | G06F 8/65 |
| 2019/0114433 A1* | 4/2019 | de Cesare | G06F 21/575 |

\* cited by examiner

SYSTEM AND METHOD FOR AUTOMATICALLY MANAGING UPDATED UEFI VARIABLES

FIELD OF THE DISCLOSURE

The present disclosure generally relates to information handling systems, and more particularly relates to a system implementing a method of automatically managing updated Unified Extensible Firmware Interface (UEFI) variables, and managing storage of updated values of those UEFI variables at an updated location within the memory of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. The information handling system may include telecommunication, network communication, and video communication capabilities. Further, the information handling system and internal or external devices of the information handling system may be initiated according to BIOS firmware code instructions adherent to the Unified Extensible Firmware Interface (UEFI) specifications

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
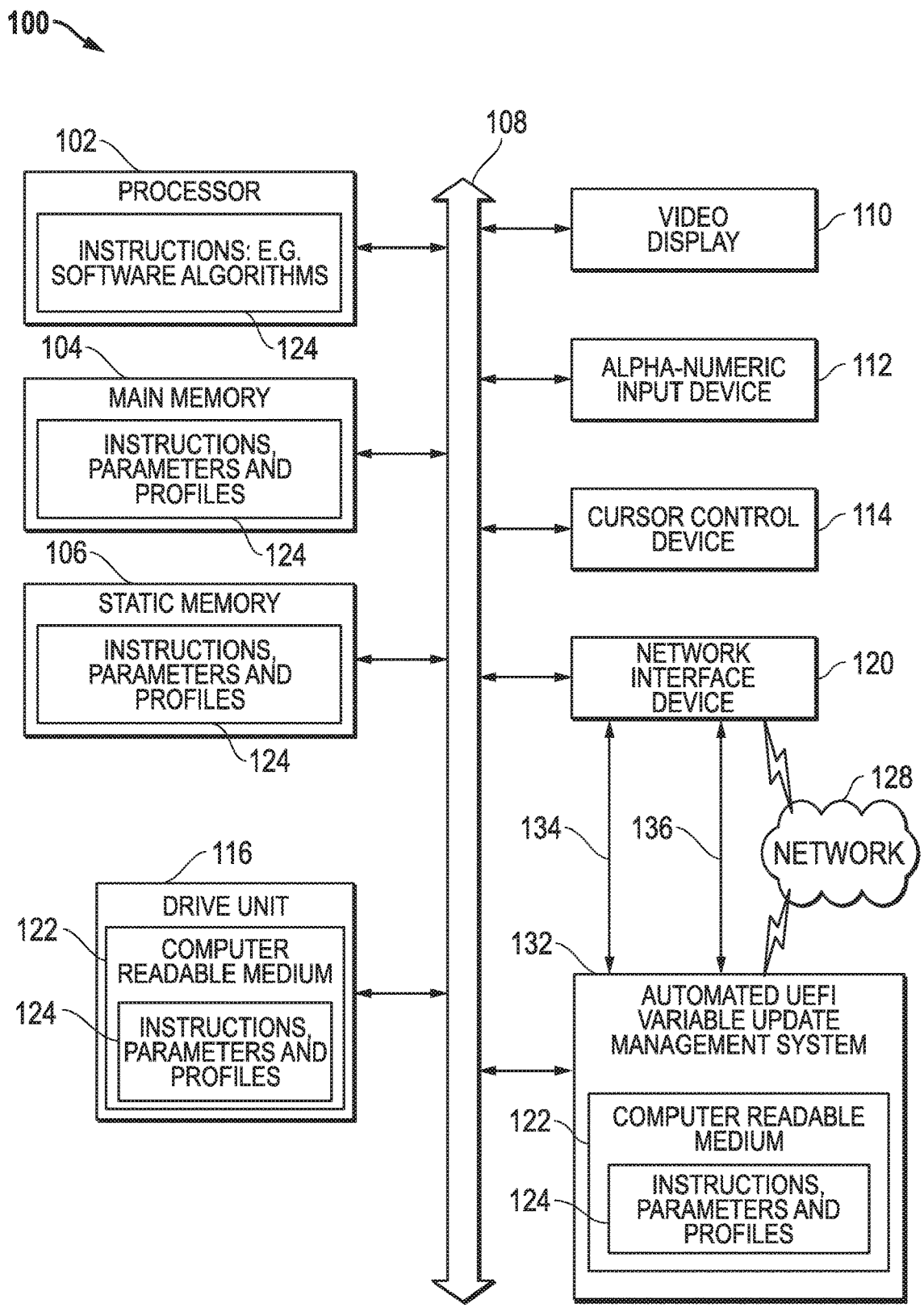
FIG. 1 illustrates a generalized embodiment of information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In order to direct the booting process of an information handling system, manufacturers of information handling systems, or of devices incorporated within information handling systems (e.g. processors or other hardware) often generate a plurality of BIOS code instructions, each saved as a different file in a hierarchy of files, such that the processor of the information handling system may access each file and execute the code instructions within, in a specific order. The Basic Input/Output System (BIOS) is a type of firmware used to perform hardware initialization during the booting process of a personal information handling system, and to provide runtime services for operating systems and programs. The BIOS firmware is built into personal computers, and it is the first software a personal computer runs when it is powered on. If an error occurs during this first power on, or any other BIOS boot process occurring after first power on, an unrecoverable system failure may occur, inhibiting the ability of the information handling system to start its operating system. Without a functional operating system, the information handling system may become unusable for the customer, prompting the customer to return the information handling system to the manufacturer.

The Unified Extensible Firmware Interface (UEFI) is a specification that defines a software interface between an operating system and platform firmware. UEFI supplemented the BIOS firmware interface originally present in all personal information handling systems. When UEFI was created, it was aimed at addressing technical shortcomings of the prior BIOS interface, and was developed to support remote diagnostics and repair of computers, even with no operating system installed. The remote diagnostics and repair functionality allows personal computer manufacturers to access information handling systems that have undergone an unrecoverable system failure, and to correct the problem without the customer having to return the information handling system to the factory. However, correcting errors that have caused an unrecoverable system failure may be a lengthy and involved process, involving review of all BIOS data structures related to system integrity by error-prone human code analysts.

A BIOS boot process within the UEFI standard includes a pre-EFI initialization (PEI) phase, and a driver execution (DXE) phase. The PEI phase initially operates with the platform in a nascent state, leveraging only on-processor resources, such as the processor cache as a call stack, to dispatch PEI initialization modules (PEIMS). The processor can read from the memory during the PEI phase, but cannot write to it so as to add, delete, or alter any of the files stored in memory at the beginning of the boot process. The PEIMS are responsible for initializing some permanent memory complement, describing the memory in hand-off blocks (HOBs), describing the firmware volume locations in HOBs, and passing control into the DXE phase. Each of these tasks must be carried out by machine-readable, executable code instructions residing within the processor cache as a call stack. Each of these code instructions will be executed in a linear fashion, beginning with the top of the call stack, and ending with the bottom of the call stack. Each code instructions may consist of a simple "GetVariable" instruction, accompanied by a location of the variable value stored within a memory of the information handling system. The variable value may exist in the form of a file of other code instructions. The PEI phase is intended to be the thinnest amount of code necessary to achieve each of these responsibilities, so these code instructions are not accompanied by information explaining their functionalities or intended locations—it is assumed each code instruction lies in the proper position within the stack and that each item in the stack is properly formatted to execute without errors. Thus, the implementation of the PEI phase is more dependent on the processor architecture than any other phase.

As described above, the code instructions (variable value) may exist in a file, located within a memory readable by the processor during the PEI phase. Each of these files may be associated with a UEFI variable, and the code instructions of each file may be invoked by a "GetVariable" command existing within the processor cache call stack. UEFI variables provide a way to store data, in particular non-volatile data that is shared between platform firmware and operating systems or UEFI applications, including operating system loaders. Variable namespaces are identified by Global Unique Identifiers (GUIDs), and variables are key/value pairs. In other words, each UEFI variable describes a value (operating system loader code instruction file) stored at a specific location within the computing system memory, and the key of the UEFI variable describes that location.

In order for the processor to execute the UEFI variables during a BIOS boot process, the creator of a BIOS boot process must transmit to the information handling system (or generate on the information handling system itself) the code instructions (UEFI variable values), the location where the code instructions should be saved on the information handling system's memory (UEFI variable value locations), and the order in which the code instructions should be executed, as dictated by a preset order of the UEFI variables given in a BIOS image. This information may be transmitted to an information handling system in the form of a list of UEFI variables given in a preset order. The format of this information may include a Terse Executable (TE) image, or BIOS image, created in a PE32 generic executable image format supported by multiple target systems, processors, and operating systems. Each BIOS image may include one or more data files the processor of the information handling system may store (or "flash") onto a temporary memory of the information handling system. The processor may then proceed to execute a "GetVariable" call for each of the UEFI variables in the list, according to the preset order given in the BIOS image. For each UEFI variable in the list, the variable value location (key) for that UEFI variable may point the processor to retrieve from the temporary memory and execute the data file (value) associated with that UEFI variable. In such a way, the processor may access each file required in the boot process and execute the code instructions within, in a specific order.

The files UEFI applications such as operating system loaders and kernels need in order to run may be stored in an EFI system partition (ESP). Supported partition table schemes include Master Boot Record (MBR) and GUID partition table (GPT), as well as El Torito volumes. Any three of these schemes may be used to describe the location of the operating system kernels the EFIMs need to locate and access (via a "GetVariable" instructions) in order to load the operating system. Unfortunately, each of these table schemes has a different architecture or structure. If the structure of the ESP (and in turn the UEFI variable locations) is modified between boot processes, or if two different UEFI applications use two different table schemes, one or more variables may end up in an improper location within the processor cache call stack, resulting in an unrecoverable system failure, and inability to load the operating system, as described above.

BIOS updates may occur when the information handling system receives a second BIOS image including a second set of UEFI variables designed to replace an earlier executed set of UEFI variables associated with a first BIOS image. In some circumstances, the second BIOS image includes one or more of the same UEFI variables given in the first BIOS image, but with minor adjustments. For example, the second BIOS image may reflect addition of a new UEFI variable, deletion of a UEFI variable from the list of UEFI variables reflected by the first BIOS image, replacement of a UEFI variable from the list of UEFI variables reflected by the first BIOS Image with a new UEFI variable, and/or a change in the order in which the processor is directed to execute each UEFI variable. In other circumstances, the second BIOS image reflects a more substantial alteration in the UEFI variables reflected in the first BIOS image. For example, the second BIOS image may require a reformatting of the temporary memory within the information handling system, and consequently, changes to the variable value locations for each of the UEFI variables included in the second BIOS image. Each of these described changes presents a potential for the processor to execute one or more variable values incorrectly during the boot process, resulting in an unrecoverable system failure, and requiring a debugging process to identify where the error occurred.

As described above, because the PEI phase is intended to be the thinnest amount of code necessary to prepare the memory for correct execution of the boot process, the UEFI variables (and BIOS images) may not include information explaining the functionalities, changes in values, or changes in intended locations of any of the UEFI variables. This may make the process of identifying which error has caused the unrecoverable system failure, and a solution for that error exceedingly difficult, especially for error-prone human code reviewers. A process that tracks edits to UEFI variables between BIOS updates is needed.

Embodiments of the present disclosure provide a process of tracking edits to UEFI variables between BIOS updates by generating a variable update map recording, for each UEFI variable in each BIOS image version, the version of the BIOS Image in which it is included, the variable value, and the variable value location. By mapping this information, the automated UEFI variable update management system provides a detailed description of the ways in which each UEFI variable may be altered between BIOS updates. This approach may greatly limit the number of UEFI variables a code reviewer must review in order to determine the location of the error, by highlighting which UEFI variables have changed between updates.

As described above, the processor can only read from the memory during the PEI phase of the boot process. In contrast, the processor may write to the memory during the DXE phase of the boot process. In an embodiment, the first BIOS image may be stored on the information handling system, and the information handling system may receive the second BIOS image as an update or revision of the first BIOS image. In such an embodiment, during the PEI phase of the boot process, the automated UEFI variable update management system may generate the variable update map, and manage storage of each of the UEFI variable values included in the second BIOS image within the information handling system memory for later execution during the DXE phase of the boot process. The automated UEFI variable update management system in such an embodiment may also store the variable update map within the memory of the information handling system for later use during a remote debugging session, in the case of an unrecoverable system failure resulting in the edits made to the UEFI variables in the second BIOS image.

In another embodiment, the first and second BIOS images may be created and stored at a facility located remotely from the information handling system that will execute the boot process, such as at a computer manufacturing facility. In such an embodiment, the automated UEFI variable update management system, operating at the remote facility, may generate the variable update map at the remote facility, and transmit the variable update map along with the second BIOS image to the information handling system that will execute the UEFI variables given in the second BIOS image. The automated UEFI variable update management system in such an embodiment may also store a map describing the edits for later use during a remote debugging session within a memory at the manufacturing facility, in the case of an unrecoverable system failure occurring at the remotely located information handling system resulting from execution of the UEFI variables given in the transmitted second BIOS image.

As described above, in some circumstances, the second BIOS image includes one or more of the same UEFI variables given in the first BIOS image, resulting in a UEFI variable pointing the processor to execute a file that it has previously executed in a prior boot process according to the first BIOS image, and that is already stored in the temporary memory of the information handling system. Two problems may occur in such a scenario: (1) the file located at that location in the temporary memory may have been deleted or corrupted between the execution of the first BIOS image UEFI variables and receipt of the second BIOS image; and (2) execution of the UEFI variables given in the second BIOS image may require repartitioning of the temporary memory, resulting in deletion and/or corruption of the file saved at that location prior to its execution.

The automated UEFI variable update management system in an embodiment may avoid the scenario in which a file located in the temporary memory and called for execution following receipt of the second BIOS image has been corrupted or deleted. The automated UEFI variable update management system may do so by recording the uncorrupted variable value (saving a copy of the correct file) to the variable update map prior to execution of the UEFI variables, and managing storage of the correct, uncorrupted variable value to the location within temporary memory prior to execution of the corrupted file previously saved at that location. In such an embodiment, the automated UEFI variable update management system may achieve such a management through the use of PEI hand-off blocks (HOBs) during the PEI phase of the boot process.

The automated UEFI variable update management system in an embodiment may avoid the scenario in which execution of the UEFI variables given in the second BIOS image requires repartitioning of the temporary memory, resulting in deletion and/or corruption of a necessary file prior to its execution. In an embodiment, the automated UEFI variable update management system in an embodiment may do so by recording the variable value (which does not change between BIOS updates) and associating the variable value with both the variable value location according to the first partition format, and with a new variable value location according to the second partition format. In such an embodiment, the automated UEFI variable update management system may then store the variable value and the new variable value location given in the new partition format in a hand-off block during the PEI phase, then retrieve that variable value from the hand-off block during the DXE phase and save the variable value to the new variable value location recorded in the hand-off block within the newly partitioned memory.

Examples are set forth below with respect to particular aspects of an information handling system operating an automated UEFI variable update management system to automatically manage updated UEFI variables.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions. Specifically, the information handling system 100 may operate on a computing device located within a manufacturing facility, on a computing device located remotely from the manufacturing facility, or may encompass both a computing device located within a manufacturing facility and a computing device located remotely from the manufacturing facility, as described in greater detail below.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the automated UEFI variable update management system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and a cursor control device 114, such as a mouse, touchpad, or gesture or touch screen input.

Network interface device 120 represents a NIC disposed within information handling system 100, on a main circuit board of the information handling system, integrated onto another component such as processor 102, in another suitable location, or a combination thereof. The network interface device 120 can include another information handling system, a data storage system, another network, a grid management system, another suitable resource, or a combination thereof. Network interface device 120 in an embodiment may operably connect to a network 128. Connection to network 128 may be wired or wireless.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of code instructions 124 that can be executed to cause the computer system to perform any one or more of the methods or computer based functions disclosed herein. For example, information handling system 100 includes one or more application programs 124, and Basic Input/Output System and Firmware (BIOS/FW) code instructions 124. BIOS/FW code instructions 124 function to initialize information handling system 100 on power up, to launch an operating system, and to manage input and output interactions between the operating system and the other elements of information handling system 100. In a particular embodiment, BIOS/FW code instructions 124 reside in main memory 104, and include machine-executable code that is executed by processor 102 to perform various functions of information handling system 100. Main memory 104 may include, but may not be limited to non-volatile random access memory, and may be partitioned according to the Unified Extensive Firmware Interface standard EFI partition system. In another embodiment, application programs and BIOS/FW code reside in another storage medium of information handling system 100. For example, application programs and BIOS/FW code can reside in static memory 106, drive unit 116, in a ROM (not illustrated) associated with information handling system 100 or other memory. Other options include application programs and BIOS/FW code sourced from remote locations, for example via a hypervisor or other system, that may be associated with various devices of information handling system 100 partially in main memory 104, static memory 106, drive unit 116 or in a storage system (not illustrated) associated with network interface device 120 or any combination thereof. Application programs 124, and BIOS/FW code instructions 124 can each be implemented as single programs, or as separate programs carrying out the various features as described herein. Application program interfaces (APIs) such as Win 32 API may enable application programs 124 to interact or integrate operations with one another.

In an example of the present disclosure, the processor 102 may execute code instructions 124 of the automated UEFI variable update management system 132 as disclosed herein, and an API may enable interaction between the application program and device drivers and other aspects of the information handling system and an automated UEFI variable update management system 132 thereon. The information handling system 100 may operate as a standalone device or may be connected, such as via a network, to other computer systems or peripheral devices. Specifically, the automated UEFI variable update management system may operate on an information handling system located within a manufacturing facility, may operate on an information handling system remotely located from the manufacturing facility and connected to the information handling system located within the manufacturing facility via the network 128, or may operate on both of these information handling systems.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The automated UEFI variable update management system 132 and the drive unit 116 may include a computer-readable medium 122 such as a magnetic disk in an example embodiment. The computer-readable medium of the main memory 104, static memory 106, drive unit 116, and automated UEFI variable update management system 132 may store one or more sets of code instructions 124, such as software code corresponding to the present disclosure. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The automated UEFI variable update management system 132 computer readable medium 122 may also contain space for data storage. The information handling system 100 may also include an automated UEFI variable update management system 132 that may be operably connected to the bus 108. The automated UEFI variable update management system 132 may perform tasks related to managing storage of updated UEFI variables within the main memory 104 of an information handling system during the PEI and DXE phases of a boot process. In an embodiment, the automated UEFI variable update management system 132 may communicate with the main memory 104, the processor 102, the video display 110, the alpha-numeric input device 112, and the network interface device 120 via bus 108, or several forms of communication 134 and 136 may be used, including ACPI, SMBus, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as a Intel® Core class processor, ARM® brand processors, Qualcomm® Snapdragon processors, or other processors and chipset, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
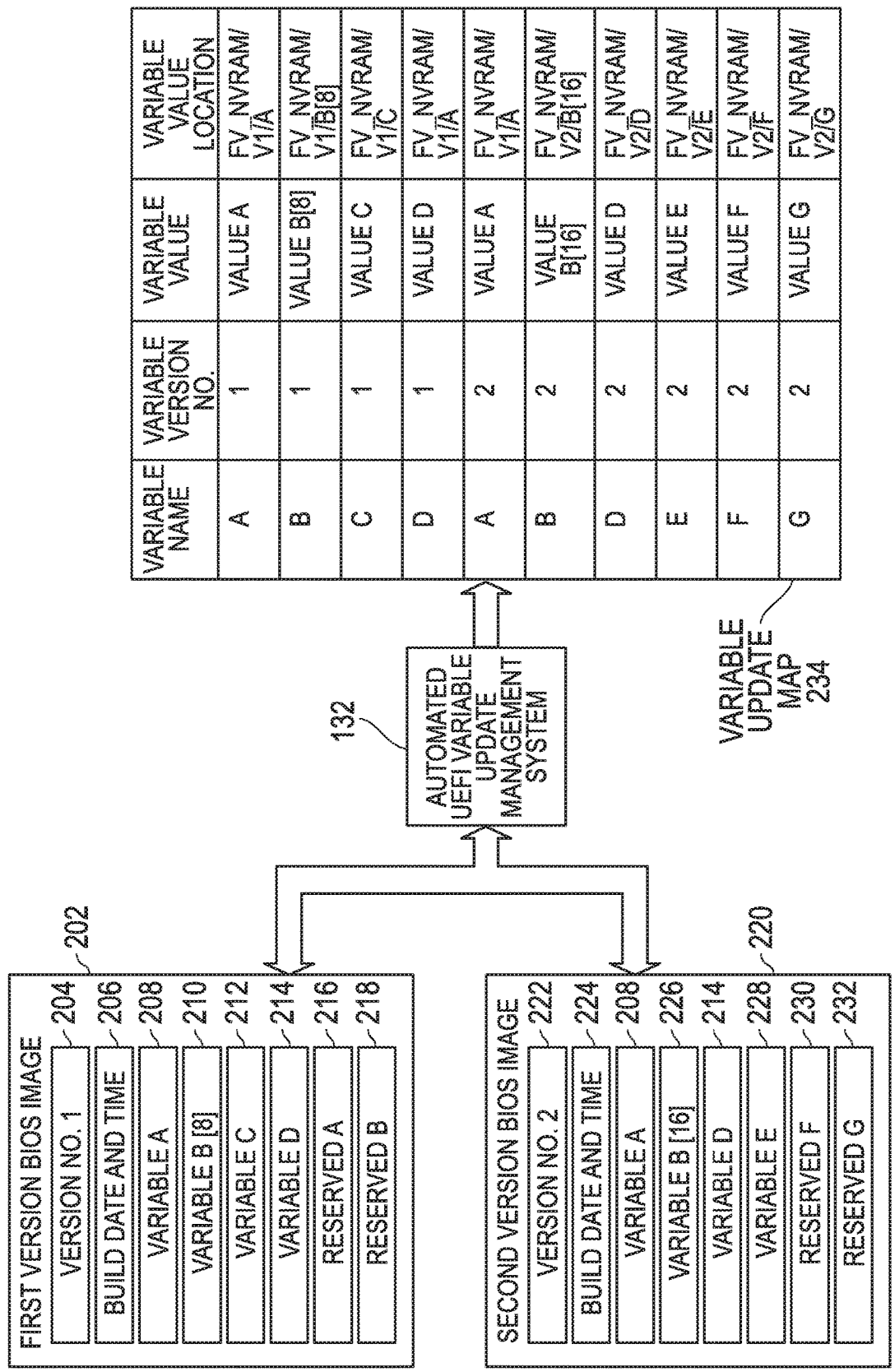
FIG. 2 is a flow diagram illustrating a method of generating a variable update map according to an embodiment of the preset disclosure.

FIG. 2 is a block diagram illustrating a method of generating a variable update map according to an embodiment of the present disclosure. As shown in FIG. 2, the automated UEFI variable update management system 132 in an embodiment may access a first list of UEFI variables 208-214 in a first version BIOS image 202 and a second list of UEFI variables 208, 214, and 226-232 in a second version BIOS image 220. Although the UEFI standard supplemented the BIOS system, these two terms are still used interchangeably in some aspects. Reference to BIOS images and BIOS updates throughout this specification is understood to include load images and updates of load images conforming to the UEFI standards.

As described above, in order to direct the booting process of an information handling system, manufacturers of information handling systems, or of devices incorporated within information handling systems (e.g. processors or other hardware) often generate a plurality of code instructions, each saved as a different file in a hierarchy of files, such that the processor of the information handling system may access each file and execute the code instructions within, in a specific order. In order for the processor to do so, the creator of a BIOS boot process must transmit to the information handling system (or generate on the information handling system itself) the code instructions, the location where the code instructions should be saved on the information handling system's memory, and the order in which the code instructions should be executed. In the UEFI standards, this information takes the form of UEFI variable values (files of code instructions), UEFI variable keys (locations of the code instruction files saved in memory of the information handling system), and a stack of the UEFI variables indicating the order in which each UEFI variable should be accessed and executed. This information may be transmitted to an information handling system in the form of a Terse Executable (TE) image, or BIOS image, created in a PE32 generic executable image format supported by multiple target systems, processors, and operating systems. Each BIOS image may include one or more data files the processor of the information handling system may read from the image and save to its memory. A variable update map 234 describing each of the UEFI variables as they exist in both a first version BIOS image and a second version BIOS image, including values for each UEFI variable in the update map may be transmitted to an information handling system along with the second version BIOS image 220.

Although FIG. 2 describes a first version BIOS image 202 and a second version BIOS image 220, the first version BIOS image 202 in an embodiment may in fact be any BIOS image stored on an information handling system that the information handling system has already executed during a boot process. The second version BIOS image 220 in an embodiment may be any later revision of the first version BIOS image that includes at least one UEFI variable that was not included in the first version BIOS image 202, at least one UEFI variable that was included in the first version BIOS image but has a different position in the order of UEFI variables, or at least one UEFI variable that was included in the first version BIOS image but has since been altered somehow (e.g. has a different key or value, or adheres to a different partitioning format). Further the second version BIOS image in an embodiment may have not yet been executed by the information handling system during a boot process.

As shown in FIG. 2, a first version BIOS image 202 in an embodiment may be generated to include a version number 204 (here, version number 1) that describes which update the first version BIOS image 202 provides, and a build date and time 206, describing when the update was generated by the manufacturing facility or on the information handling system itself. Generally speaking, most BIOS updates are generated by the manufacturer of the hardware components the firmware of the information handling system loads and controls through the BIOS boot process. The manufacturer, following creation of a BIOS update, may transmit the BIOS update to the information handling system, located remotely from the manufacturing facility, for execution by the information handling system during a BIOS boot process. If the BIOS boot process following receipt of a BIOS update results in an unrecoverable system failure, it is useful during the debugging process that follows to know which of the updates (given by version number, build and date time) caused the unrecoverable system failure.

As also shown in FIG. 2, the first version BIOS image 202 in an embodiment may also include a number of UEFI variables 208-214. As described above, UEFI variables in an embodiment may provide a way to store data, in particular non-volatile data that is shared between platform firmware and operating systems or UEFI applications, including operating system loaders. Variable namespaces are identified by Global Unique Identifiers (GUIDs), and variables are key/value pairs. In other words, each UEFI variable in an embodiment may describe a value (operating system loader code instruction file) stored at a specific location within the computing system memory, and the key of the UEFI variable may describe that location within the computing system memory. For example, Variable A—208 of the first version BIOS image 202 in an embodiment may have a value that is an operating system loader or kernel needed to initialize the information handling system operating system. Alternatively, the value of Variable A may be any other code instruction not tied to loading of an operating system. As another example, the key of Variable A—208 in an embodiment may be the file path FV_NVRAM/V1/A, which describes the location of the value (the operating system loader or kernel) saved within the computing system memory. As shown in FIG. 2, the first version BIOS image 202 in an embodiment may include several similar UEFI variables including similar keys (file path locations) pointing to similar values (operating system loaders or kernels, or other firmware code instructions) saved at the file path location within the computing system memory, including Variable B [8]—210, Variable C—212, and Variable D—214.

As also shown in FIG. 2, the first version BIOS image 202 in an embodiment may include one or more slots, including Reserved A—216, and Reserved B—218, that are reserved for addition of further UEFI variables in later updates. In some embodiments, the first version BIOS image 202 has a fixed size, which means there are a fixed number of slots for UEFI variables. In such an embodiment, one or more slots, such as for example Reserved A—216 and Reserved B—218 may be created as placeholders within the first version BIOS image 202 where more UEFI variables may be added in later BIOS updates. In other embodiments, the first version BIOS image 202 does not have a fixed size, and Reserved A—216 and Reserved B—218 may not be created as placeholders within the first version BIOS image 202.

As shown in FIG. 2, a second version BIOS image 220 in an embodiment may be generated to include a different version number (Version No. 2—222), and a different build and date time—224 than those given in the first version BIOS image 202. These values may indicate that the second version BIOS image 220 in an embodiment may have been created after the first version BIOS image 202. Further, the second version BIOS image 220 in an embodiment may include one or more UEFI variables that were also included in the first version BIOS image 202, including Variable A—208, and Variable D—214. The second version BIOS image 220 in an embodiment may also include one or more UEFI variables that were not included in the first version BIOS image 202, such as Variable E—228, Variable F—230, and Variable G—232. The second version BIOS image 220 in an embodiment may also include one or more UEFI variables that have the same name as a variable in the first version BIOS image 202, but have been somehow altered in the second version BIOS image 220, such as, for example, Variable B. For example, in an embodiment, Variable B [8]—210 may have a name "Variable B" and its value may have a size of 8 bytes in the first version BIOS image 202. Variable B [16]—226 in the same embodiment may have the same name "Variable B" in the second version BIOS image 220, but its value may have a size of 16 bytes.

The automated UEFI variable update management system 132 in an embodiment may access the first version BIOS image 202 and the second version BIOS image 220 in order to save the values and key associated with each UEFI variable given in both the first version BIOS image 202 and the second version BIOS image 220 to a variable update map 234, as shown in FIG. 2. As also shown in FIG. 2, the automated UEFI variable update management system 132 in an embodiment may also associate each UEFI variable stored in the variable update map 132 with the version number of the BIOS image in which that UEFI variable appears. As described above, the automated UEFI variable update management system in an embodiment may operate on an information handling system located within a manufacturing facility to access the first version BIOS image 202 and second version BIOS image 220, both of which may have been generated at the manufacturing facility and stored to a memory of the information handling system located within the manufacturing facility. In another embodiment, the automated UEFI variable update management system may operate on an information handling system remotely located from the manufacturing facility and connected to the information handling system located within the manufacturing facility via the network 128. In such an embodiment, the automated UEFI variable update management system may operate to access the first version BIOS image 202 (stored on the memory of the remotely located information handling system and previously executed by the remotely located information handling system during a boot process) with the second version BIOS image 220 received from the manufacturing facility (and not yet stored to the memory of the remotely located information handling system or executed by the remotely located information handling system). In yet another embodiment, the automated UEFI variable update management system may incorporate machine-readable executable code instructions operating on both the information handling system located within the manufacturing facility and on the remotely located information handling system.

The automated UEFI variable update management system in an embodiment may generate a variable update map 234 that records information pertaining to each UEFI variable listed in the first version BIOS image 202 and the second BIOS image 220. As an example, and as shown in FIG. 2, the variable update map 234 in an embodiment may identify each of the UEFI variables that were included in Version 1, including Variables A-D, as shown in the left most column of the variable update map 234. As another example, and as shown in FIG. 2, the variable update map 234 in an embodiment may identify each of the UEFI variables that were included in Version 2, including Variables A, D, and E-G, as shown in the left most column of the variable update map 234.

As shown in the second column from the left of the variable update map 234 in FIG. 2, the automated UEFI variable update management system 132 in an embodiment may determine and record within the variable update map 234 the version with which each variable is associated. A variable may be associated with more than one version, and if so, the variable update map 234 may contain more than one row for such a variable. For example, as shown in the first row, and in the fifth row of the variable update map 234, variable A may be given two rows within the map—one pertaining to variable A as shown in the version 1 BIOS image, and one pertaining to variable A as shown in the version 2 BIOS image. In contrast, variables included in only one version of the BIOS image may be given only one row in the variable update map 234. For example, as shown in the third, and eighth through tenth rows of the variable update map 234, variable C is only given one row because it is only associated with version 1, and variables E-G are each only given one row because they are each only associated with version 2.

As shown in the third column from the left of the variable update map 234 in FIG. 2, the automated UEFI variable update management system 132 in an embodiment may record a value for each UEFI variable within the variable update map 234 and associate that value with its variable's name. As described above, the variable update map 234, including values for each UEFI variable in the variable update map 234 may be transmitted to a remote information handling system along with the second version BIOS image 220. For example, the automated UEFI variable update management system 132 in an embodiment may access the first version BIOS image 202 and record in the variable update map 234 in the third column from the right the values Value A associated with Variable A 208, Value B[8] associated with Variable B [8] 210, Value C associated with Variable C 212, and Value D associated with Variable D 214. As a further example, the automated UEFI variable update management system 132 in an embodiment may access the Second version BIOS image 220 and record in the variable update map 234 in the third column from the right the values Value A associated with Variable A 208 shown in the second version BIOS image 220, Value B[16] associated with Variable B[16] 226, Value D associated with Value D 214 shown in the second version BIOS image 220, Value E associated with Variable E 228, Value F associated with Variable F 230, and Value G associated with Variable G 232. Generation of the variable update map 234 and storage of the variable update map 234 at either the manufacturing facility or the remotely located information handling system provides a process that automatically tracks edits to UEFI variables between BIOS updates, and eases the burden of debugging in the case of an unrecoverable system failure.

As shown in the far left column of the variable update map 234 shown in FIG. 2, the automated UEFI variable update management system in an embodiment may record the location in the memory of an information handling system executing the variable values of each UEFI variable in the variable update map 234. As described above, each UEFI variable in a BIOS image includes a variable key indicating the location in memory of the variable value (file of code instructions). The automated UEFI variable update management system 132 in an embodiment may access the first version BIOS image 202 and record in the variable update map 234 the keys shown in the first version BIOS image 202 associated with each UEFI variable in the first version BIOS image 202. For example, the automated UEFI variable update management system 132 in an embodiment may access the first version BIOS image 202 and record in the variable update map 234 the pathname for a storage location in the memory of the information handling system executing the variable values (variable key) FV_NVRAM/V1/A associated with Variable A 208, the pathname FV_NVRAM/V1/B[8] associated with Variable B[8] 210, the pathname FV_NVRAM/V1/C associated with Variable C 212, and the pathname FV_NVRAM/V1/D associated with Variable D 214.

The automated UEFI variable update management system 132 in an embodiment may also access the second version BIOS image 220 and record in the variable update map 234 the keys shown in the second version BIOS image 220 associated with each UEFI variable in the second version BIOS image 220. For example, the automated UEFI variable update management system 132 in an embodiment may access the second version BIOS image 220 and record in the variable update map 234 the pathname for a storage location in the memory of the information handling system executing the variable values (variable key) FV_NVRAM/V1/A associated with Variable A 208, the pathname FV_NVRAM/V2/B[16] associated with Variable B[16] 226, the pathname FV_NVRAM/V2/D associated with Variable D 214, the pathname FV_NVRAM/V2/E associated with Variable E 228, the pathname FV_NVRAM/V2/F associated with Variable F 230, and the pathname FV_NVRAM/V2/G associated with Variable G 232.

As shown in FIG. 2, one or more UEFI variables may be included in both the first version BIOS image 202 and the second version BIOS image 220. In such a scenario, the variable value and variable value location for each such UEFI variable may be recorded twice in the variable update map 234. For example, as shown in FIG. 2, Variable A 208 and Variable D 214 are included in both the first version BIOS image 202 and the second version BIOS image 220. As a further example, as shown in FIG. 2, Value A is recorded twice in the variable update map 234 (in the first and fifth rows), and Value D is recorded twice in the variable update map 234 (in the fourth and sixth rows). As a further example, as shown in FIG. 2 within the variable update map 234, variable A 208 is associated in the first row with the file pathname FV_NVRAM/V1/A and associated in the fifth row with the same file pathname FV_NVRAM/V1/A, while variable D 214 is associated in the fourth row with the file pathname FV_NVRAM/V1/D and associated in the sixth row with the different file pathname FV_NVRAM/V2/D.

In an embodiment, the variable value location for a variable included in the first version BIOS image 202 and in the second version BIOS image 220 may remain the same between versions. For example, in an embodiment, the variable value location FV_NVRAM/V1/A associated with Variable A 208 as included in the first version BIOS image 202 may match the variable value location FV_NVRAM/V1/A associated with Variable A 208 as included in the second version BIOS image 202. In such an embodiment, the location of the variable value in the memory of the information handling system executing the UEFI variables included in the first version BIOS image 202 and the second version BIOS image 220 does not change. However, in some cases, the variable value that has been stored at that variable value location may have been accessed and altered, deleted, or corrupted between execution of the first version BIOS image 202 and receipt of the second version BIOS image 220. In such a scenario, the correct variable value for that UEFI variable may need to be stored in the given variable value location within the memory prior to execution of the variable value.

For example, if Value A were stored in the variable value location FV_NVRAM/V1/A during execution of the UEFI variables given in the first version BIOS image 202, but Value A as stored at FV_NVRAM/V1/A were altered, deleted from that location, or corrupted and resaved to that location, instructing the processor to execute the value (file) located at the location FV_NVRAM/V1/A during execution of the UEFI variables in the second version BIOS image 220 may result in the processor calling and executing a corrupted or deleted file, even though the value associated with Variable A 208 did not change between the first version BIOS image 202 and the second version BIOS image 220. The automated UEFI variable update management system 132 in such an embodiment may avoid this problem by recording within the variable update map 234 the correct variable value Value A and associating it with the variable value location FV_NVRAM/V1/A, and instructing the processor of the information handling system executing the UEFI variables in the second version BIOS image 220 to store Value A at the location FV_NVRAM/V1/A prior to execution of the value stored at FV_NVRAM/V1/A.

In another embodiment, the variable value location for a variable included in the first version BIOS image 202 and in the second version BIOS image 220 may differ. For example, in an embodiment, the variable value location FV_NVRAM/V1/D associated with Variable D 214 as included in the first version BIOS image 202 may differ from the variable value location FV_NVRAM/V2/D associated with Variable D 214 as included in the second version BIOS image 220. In such an embodiment, the variable value associated with Variable D 214 may be stored at one location in the memory of the information handling system executing the UEFI variables included in the first version BIOS image 202, and the variable value associated with Variable D 214 may be stored at a different location in the memory of the information handling system when executing the UEFI variables included in the second version BIOS image 220. Such an embodiment may occur in the case of a second version BIOS image 220 requiring a reformatting of the partitions within the memory of the information handling system prior to execution of the UEFI variables in the second version BIOS image.

As described above, the files UEFI applications such as operating system loaders and kernels need in order to run may be stored in an EFI system partition (ESP). Supported partition table schemes include Master Boot Record (MBR) and GUID partition table (GPT), as well as El Torito volumes. Any three of these schemes may be used to describe the location of the operating system kernels the EFIMs need to locate and access (via a "GetVariable" instructions) in order to load the operating system. Unfortunately, each of these table schemes has a different architecture or structure. If the structure of the ESP (and in turn the UEFI variable locations) is modified between boot processes, or if two different UEFI applications use two different table schemes, one or more variables may end up in an improper location within the processor cache call stack, resulting in an unrecoverable system failure, and inability to load the operating system, as described above.

For example, the first version BIOS image 202 in an embodiment may require the memory of the information handling system executing the UEFI variables to adhere to the MBR partition format, and the second version BIOS image 220 in an embodiment may involve reformatting the memory of the information handling system executing the UEFI variables to the El Torito partition format. The MBR and El Torito partition formats may have completely different ways of organizing files and describing their locations within that organization. As a consequence, the processor of the information handling system executing the UEFI variables may not be capable of locating a file (or variable value) within a memory partition according to the El Torito format if the location of that file is described to the processor according to the MBR partition format.

The automated UEFI variable update management system 132 in an embodiment may overcome this problem by storing within the variable update map 234, for each UEFI variable included within the first version BIOS image 202 and the second version BIOS image 220, the variable value location from both the first version BIOS image 202 and the second version BIOS image 220. For example, if the first version BIOS image 202 required the memory to be partitioned according to the MBR format and the second version BIOS image 220 required the memory to be partitioned according to the El Torito format, the variable value location FV_NVRAM/V1/D associated with Variable D 214 in the first version BIOS image 202 may adhere to the MBR format, and the variable value location FV_NVRAM/V2/D associated with Variable D 214 in the second version BIOS image 220 may adhere to the El Torito format. In other words, although the variable value Value D for Variable D 214 may not differ between the first version BIOS image 202 and the second version BIOS image 220, the location of Value D or the description of the location of Value D within the memory of the information handling system executing Value D may differ. By recording the both of the variable value locations associated with Variable 214 as given in the first version BIOS image 202 and the second version BIOS image 220, the automated UEFI variable update management system 132 in an embodiment may avoid the problem of the processor of the information handling system executing the UEFI variables not being capable of locating a file (or variable value) within a memory partition according to one format if the location of that file is described to the processor according to another format.

Further, if the first action the processor takes upon accessing the memory of the information handling system executing the UEFI variables is to repartition the memory, the variable values that were stored in the memory prior to repartitioning will be immediately erased or corrupted by partial erasure or rewriting. The automated UEFI variable update management system 132 in an embodiment may avoid this problem by recording, for each UEFI variable included in both the first version BIOS image 202 and the second version BIOS image 220, the variable value associated with each such UEFI variable as included in both the first version BIOS image 202 and the second version BIOS image 220, even if that variable does not change between versions. For example, as described above and as shown in FIG. 2, although the variable value Value D for Variable D 214 may not differ between the first version BIOS image 202 and the second version BIOS image 220, the location of Value D or the description of the location of Value D within the memory of the information handling system executing Value D may differ.

If the first action the processor takes upon accessing the memory of the information handling system executing the UEFI variables is to repartition the memory, the variable value Value D that was stored in the memory at FV_N-VRAM/V1/D may be immediately erased or corrupted. Thus, even though the variable update map 234 may provide a map to show where Value D is located in the memory prior to repartitioning, and a map to show where Value D should be located in the memory after repartitioning, the value Value D may be erased or corrupted before the processor can save Value D to the appropriate location according to the new partitioning format. The automated UEFI variable update management system 132 in such an embodiment may avoid this problem by recording the value Value D in the variable update map 234, and associating Value D with both the variable value location FV_NVRAM/V1/D adhering to the MBR partition format and included in the first version BIOS image 202 and with the variable value location FV_NVRAM/V2/D adhering to the El Torito format and included in the second version BIOS image 220. In such a way, the processor may reformat the memory, then access the variable value for any UEFI variable from the variable update map 234. In addition, if an unrecoverable system failure requires reversion to an earlier BIOS update (e.g. reversion from the second version BIOS image 220 to the first version BIOS image 202), the processor may repartition the memory again to revert to the earlier partition format, then access both the variable value and the correct variable value location for that partition format from the variable update map 234. FIG. 2 shows only one example embodiment of the present disclosure. It is understood other embodiments may include BIOS images having any number of variables, and any number of versions of BIOS images. Thus, the variable update map of other embodiments may include each of the (potentially large number of) variables of each of the (potentially great number of) versions of BIOS images.

Figure 3:
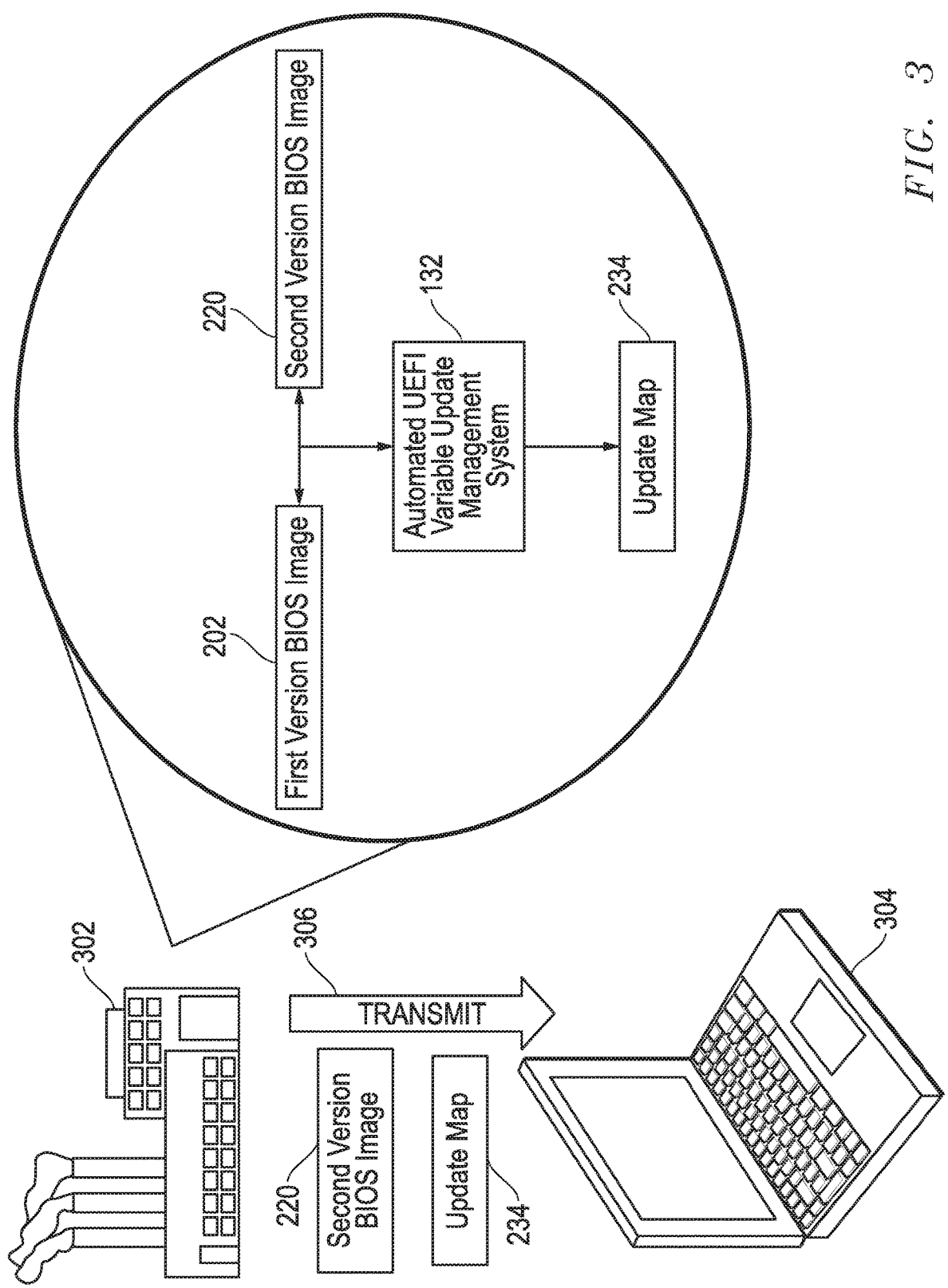
FIG. 3 is a block diagram illustrating an automated UEFI variable update management system residing at a manufacturing facility according to an embodiment of the present disclosure.

FIG. 3 is a block diagram illustrating an automated UEFI variable update management system residing at a manufacturing facility according to an embodiment of the present disclosure. As described above, the automated UEFI variable update management system in an embodiment may operate on an information handling system located within a manufacturing facility to record and store within the variable update map 234 each of the UEFI variables associated with the first version BIOS image 202 and second version BIOS image 220, both of which may have been generated at the manufacturing facility and stored to a memory of the information handling system located within the manufacturing facility.

As also described above, in order to direct the booting process of an information handling system, manufacturers of information handling systems, or of devices incorporated within information handling systems (e.g. processors or other hardware) often generate a plurality of code instructions, each saved as a different file in a hierarchy of files, such that the processor of the information handling system may access each file and execute the code instructions within, in a specific order. In order for the processor to do so, the creator of a BIOS boot process must transmit to the information handling system (or generate on the information handling system itself) the code instructions, the location where the code instructions should be saved on the information handling system's memory, and the order in which the code instructions should be executed. In the UEFI standards, this information takes the form of UEFI variable values (files of code instructions), UEFI variable keys (locations of the code instruction files saved in memory of the information handling system), and a stack of the UEFI variables indicating the order in which each UEFI variable should be accessed and executed. This information may be transmitted to an information handling system in the form of a Terse Executable (TE) image, or BIOS image, created in a PE32 generic executable image format supported by multiple target systems, processors, and operating systems. Each BIOS image may include one or more data files the processor of the information handling system may read from the image and save to its memory. As an example, each BIOS image in an embodiment may include a description of the order in which each UEFI variable should be called, and a variable update map recording the version of the BIOS image each UEFI variable is included within, and for each UEFI variable in each BIOS image, the variable value and variable value location.

As shown in FIG. 3, the automated UEFI variable update management system 132 in an embodiment may be operated on an information handling system located at a manufacturing facility 302, and may operate to record and store within the variable update map 234 each of the UEFI variables associated with the first version BIOS image 202 and second version BIOS image 220, both of which may be stored in the memory of an information handling system located within the manufacturing facility 302. At arrow 306 as shown in FIG. 3, the information handling system within the manufacturing facility 302 in an embodiment may then transmit to a remotely located information handling system 304, via a network, the second version BIOS image 220 and the variable update map 234.

Figure 4:
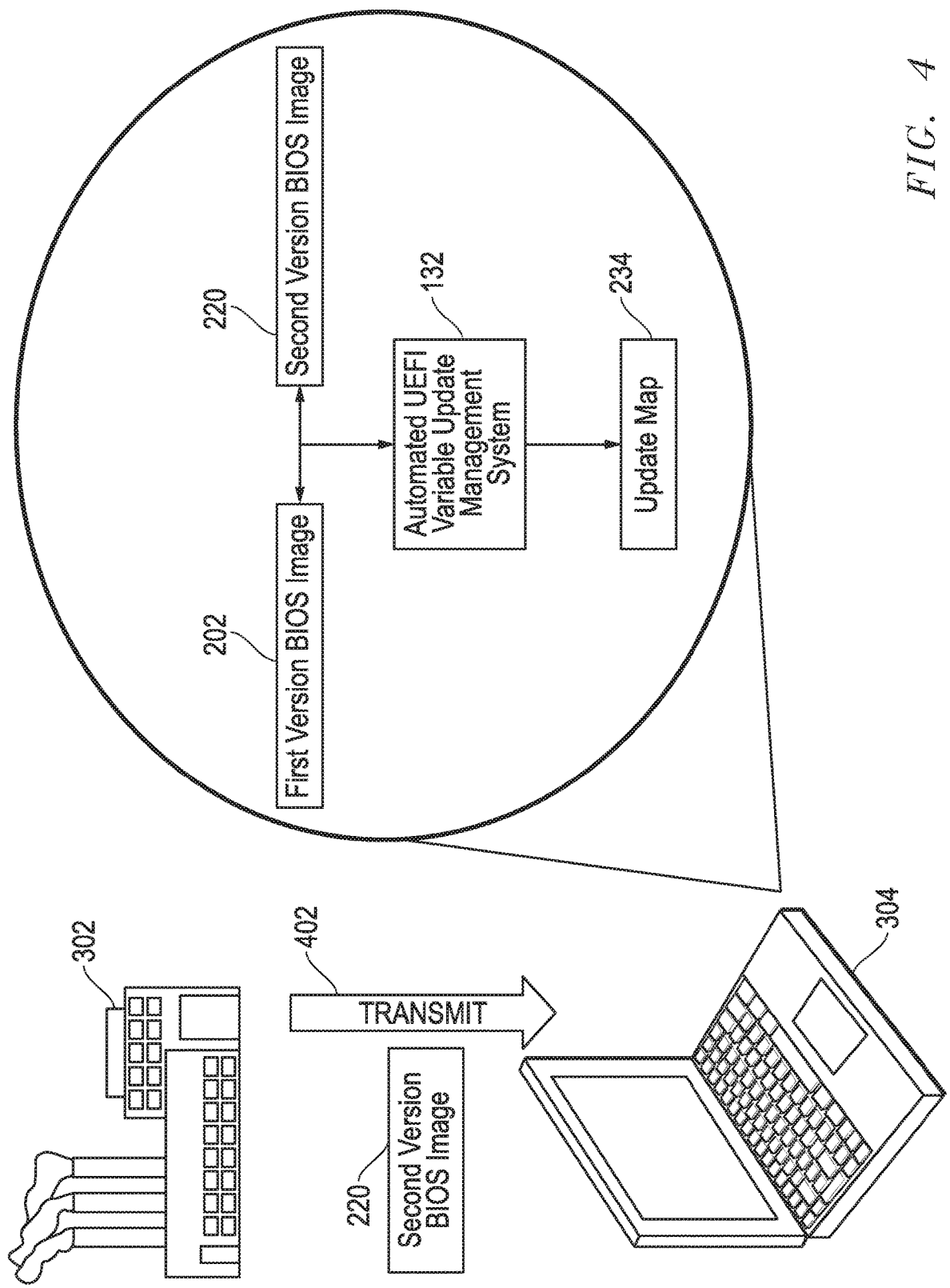
FIG. 4 is a block diagram illustrating an automated UEFI variable update management system residing at an information handling system located remotely from a manufacturing facility according to an embodiment of the present disclosure.

FIG. 4 is a block diagram illustrating an automated UEFI variable update management system residing at an information handling system located remotely from a manufacturing facility according to an embodiment of the present disclosure. As described above, in another embodiment, the automated UEFI variable update management system 132 may operate on an information handling system 304 remotely located from the manufacturing facility 302 and connected to the information handling system located within the manufacturing facility 302 via the network. The information handling system located within the manufacturing facility 302 in such an embodiment may transmit at arrow 402 the second version BIOS image 220 generated at the manufacturing facility 302 to the remotely located information handling system 304. In such an embodiment, the automated UEFI variable update management system 132, residing on the remotely located information handling system 304, may operate to record and store within the variable update map 234 each of the UEFI variables associated with the first version BIOS image 202 previously executed by the remotely located information handling system 304, and each of the UEFI variables associated with the second version BIOS image 220 received from the manufacturing facility 302 (and not yet stored to the memory of the remotely located information handling system 304 or executed by the remotely located information handling system).

Figure 5:
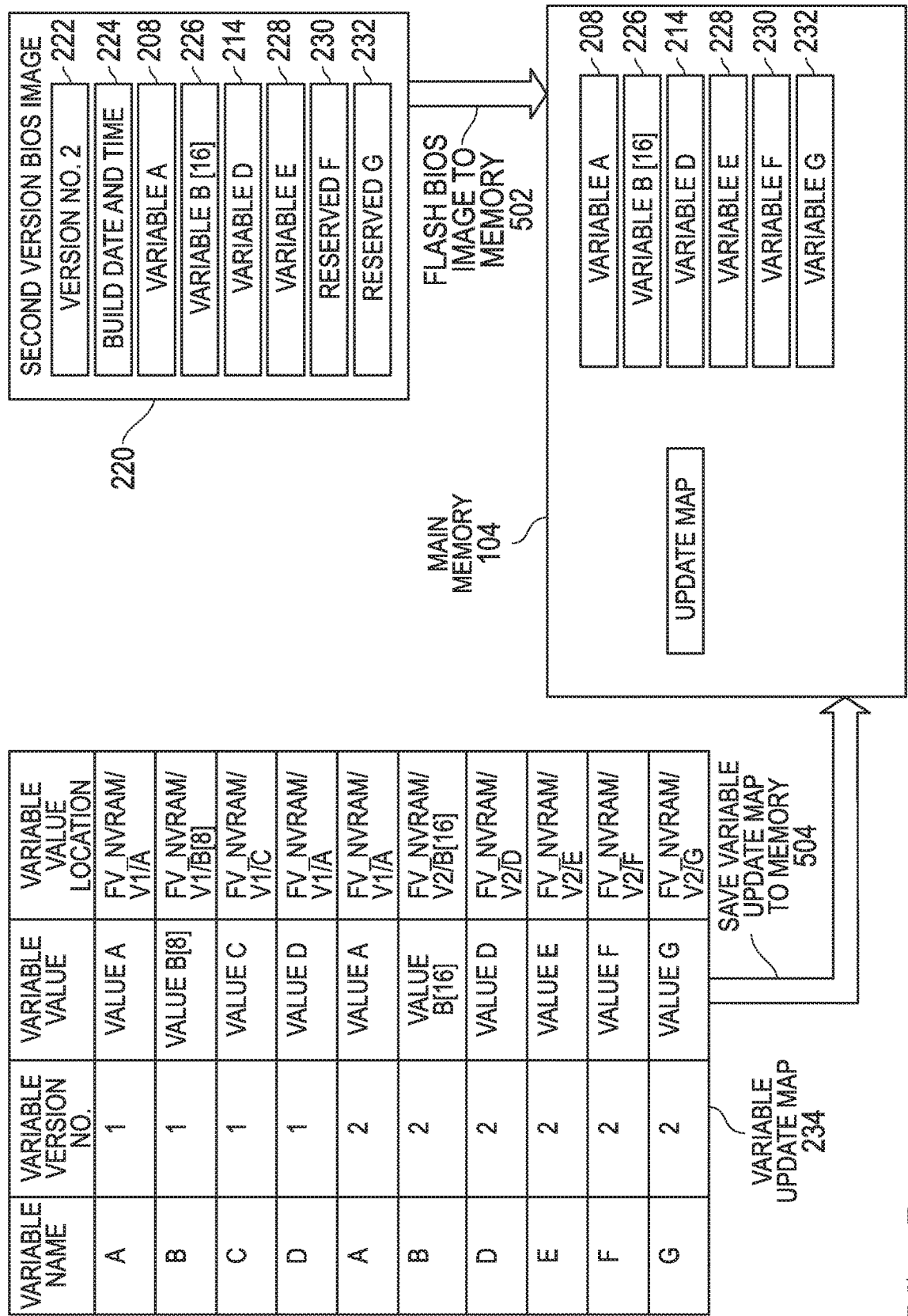
FIG. 5 is a flow diagram illustrating a process of saving a variable update map and a plurality of UEFI variables to a memory of an information handling system according to an embodiment of the present disclosure.

FIG. 5 is a flow diagram illustrating a process of saving a variable update map and a plurality of UEFI variables to a memory of an information handling system according to an embodiment of the present disclosure. At arrow 502, in an embodiment the second version BIOS image 220 may be saved (or "flashed") to the memory 104 of an information handling system. For example, as shown in FIG. 5, Variable A 208, Variable B [16] 226, Variable D 214, Variable E 228, Variable F 230, and Variable G 232 may be stored in the preset order dictated by the second version BIOS image 220 to the main memory 104. During the DXE phase of the boot process, the processor may, beginning with Variable A 208 stored in the main memory 104, execute each of the files associated with the list of UEFI variable stored in main memory, in the order in which they are stored, from top to bottom. For example, the processor may, during the DXE phase, execute a "GetVariable" command to go to the variable value location FV_NVRAM/V2/A and execute the file "Value A" stored there, then execute a "GetVariable" command to go to the variable value location FV_NVRAM/V2/B[16] and execute the file "Value B[16]" stored there, execute a "GetVariable" command to go to the variable value location FV_NVRAM/V2/D and execute the file "Value D" stored there, execute a "GetVariable" command to go to the variable value location FV_NVRAM/V2/E and execute the file "Value E" stored there, execute a "GetVariable" command to go to the variable value location FV_NVRAM/V2/F and execute the file "Value F" stored there, and execute a "GetVariable" command to go to the variable value location FV_NVRAM/V2/G and execute the file "Value G" stored there. In order for each of these executions to succeed, and in order to avoid an unrecoverable system failure, the files or variable values associated with each of these UEFI variables must be stored in the location of the main memory 104 to which the processor is pointed with the "GetVariable" command, and each file must be uncorrupted.

In order to ensure an uncorrupted variable value is stored at the correctly formatted variable value location associated with that variable value in the second version BIOS image 220, the processor may store the variable update map 234 to the main memory 104, for later use in the creation of hand-off blocks storing the correct values of each of the UEFI variables, as described below. At block 504, in an embodiment the variable update map may be stored in the memory of an information handling system. For example, as shown in FIG. 5, the variable update map 234 may be stored in the main memory 104 of the information handling system. Storage of the UEFI variable included in the second version BIOS image 220 and of the variable update map 234 recording the variable value and the variable location for each UEFI variable given in each BIOS image version may allow the processor of the information handling system to later generate PEI hand-off blocks (HOBs) in order to manage proper storage of the correct and uncorrupted variables values for each UEFI variable within the computer memory prior to the DXE phase, and to ease the process of debugging if execution of the UEFI variables included in the second version BIOS image results in an unrecoverable system failure.

Figure 6:
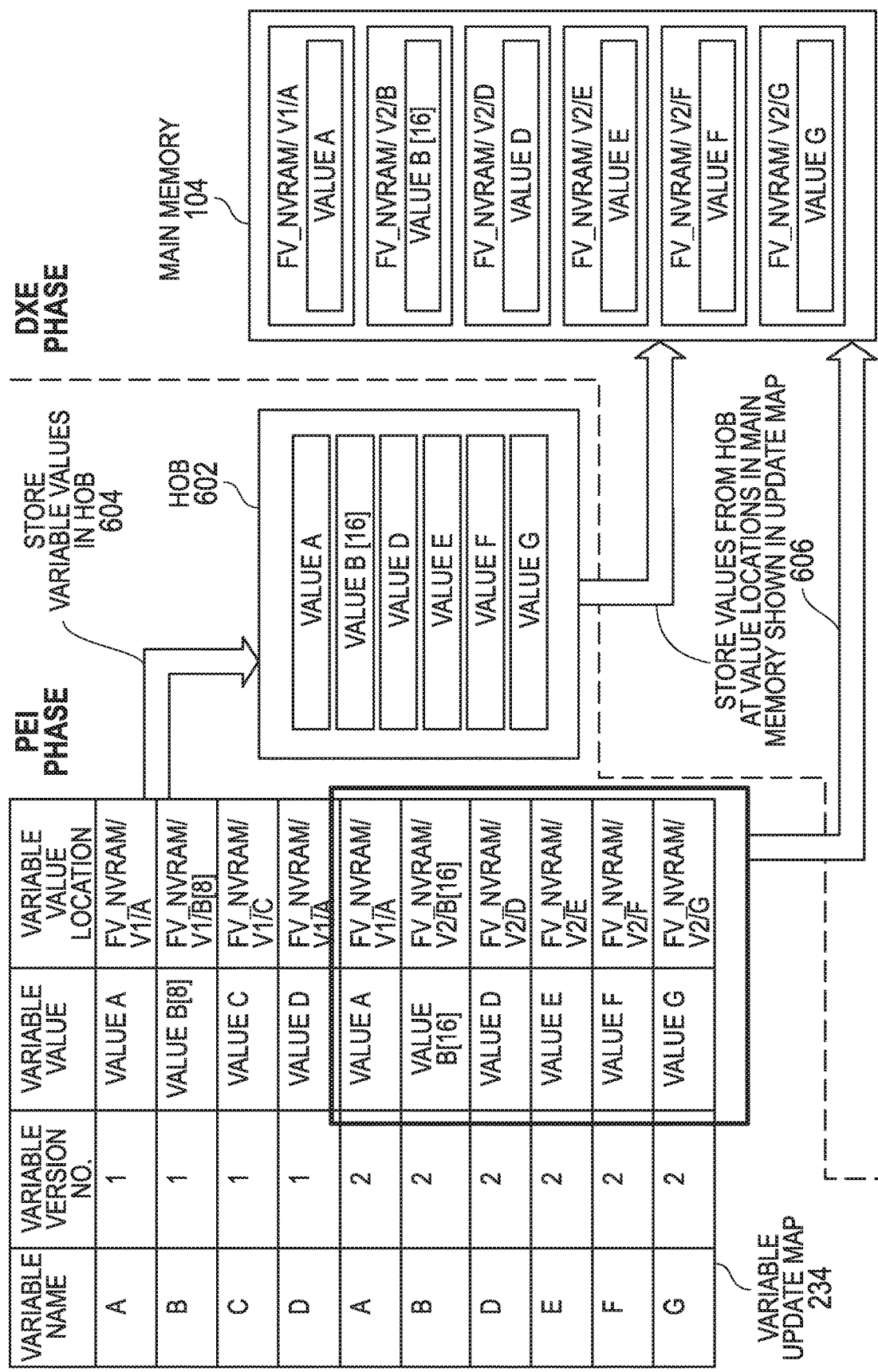
FIG. 6 is a flow diagram illustrating a method of storing UEFI variable values in a memory of an information handling system prior to the execution of the values according to an embodiment of the present disclosure.

FIG. 6 is a flow diagram illustrating a method of storing UEFI variable values in a memory of an information handling system prior to the execution of the values according to an embodiment of the present disclosure. As shown in FIG. 6, during the PEI phase of the boot process, in an embodiment, the automated UEFI variable update management system may direct the processor of the information handling system executing the UEFI variables to retrieve the variable values associated with each of the UEFI variables included in the BIOS image version currently being executed from the variable update map stored in the information handling system memory, and store those variable values in a PEI hand-off block. As described above, the variable update map 234 may have been stored in the main memory 104 of the information handling system executing the UEFI variables associated with the second version BIOS image, including Variables A, B, D, E, F, and G. As shown in FIG. 6, the variable update map 234 may include the variable values Value A, Value B[16], Value D, Value E, Value F, and Value G, associated with Variables A, B, D, E, F, and G. As shown at arrow 604, in an embodiment, the variable values Value A, Value B[16], Value D, Value E, Value F, and Value G, associated with Variables A, B, D, E, F, and G may be retrieved from the variable update map 234 and stored in HOB 602.

As also shown in FIG. 6, as the first step of the DXE phase of the second version BIOS image boot process, the automated UEFI variable update management system in an embodiment may direct the processor of the information handling system executing the UEFI variables to retrieve the variable value locations associated with each of the UEFI variables included in the BIOS image version currently being executed from the variable update map stored in the information handling system memory, and store the corresponding variable values previously stored in a PEI hand-off block to each of these variable value locations within the memory of the information handling system. For example, as shown in FIG. 6, the variable update map 234 may include the variable values locations FV_NVRAM/V2/A, FV_NVRAM/V2/B[16], FV_NVRAM/V2/D, FV_NVRAM/V2/E, FV_NVRAM/V2/F, and FV_NVRAM/V2/G, associated with Variables A, B, D, E, F, and G. As shown at arrow 606, in an embodiment, the variable values Value A, Value B[16], Value D, Value E, Value F, and Value G, associated with Variables A, B, D, E, F, and G may be retrieved from the HOB 602, and each of those respective variable values may be stored at the respective variable value locations FV_NVRAM/V2/A, FV_NVRAM/V2/B [16], FV_NVRAM/V2/D, FV_NVRAM/V2/E, FV_NVRAM/V2/F, and FV_NVRAM/V2/G within the main memory 104 of the information handling system.

As described above, in an embodiment, the variable value location FV_NVRAM/V1/A associated with Variable A as included in the first version BIOS image may match the variable value location FV_NVRAM/V1/A associated with Variable A as included in the second version BIOS image, as shown in the variable update map 234. In such an embodiment, Value A may have been stored in the variable value location FV_NVRAM/V1/A during execution of the UEFI variables given in the first version BIOS image, but Value A may have been altered, deleted from that location, or corrupted and resaved to that location since the last execution. In such an embodiment, instructing the processor to execute the value (file) located at the location FV_NVRAM/V1/A prior to the DXE phase of the second version BIOS image boot process, during execution of the UEFI variables in the second version BIOS image may result in the processor calling and executing a corrupted or deleted file, even though the value associated with Variable A did not change between the first version BIOS image and the second version BIOS image. The automated UEFI variable update management system 132 in such an embodiment may avoid this problem by instructing the processor of the information handling system executing the UEFI variables in the second version BIOS image to store Value A at a hand-off block during the PEI phase of the boot process, and as the very first step of the DXE phase of the boot process (the first time at which the processor may access and read or write to the main memory 104), to retrieve the Value A from the HOB 602, and to save the Value A at the location FV_NVRAM/V1/A within the main memory 104, prior to execution of the value stored at FV_NVRAM/V1/A. In such a way, the automated UEFI variable update management system in an embodiment may avoid the scenario in which a file located in the temporary memory and called for execution following receipt of the second BIOS image has been corrupted or deleted.

As also described above, in another embodiment, the variable value location FV_NVRAM/V1/D associated with Variable D in the first version BIOS image may adhere to the MBR memory partition format, and the variable value location FV_NVRAM/V2/D associated with Variable D in the second version BIOS image may adhere to the El Torito memory partition format. In other words, although the variable value Value D for Variable D may already be stored within the main memory 104 prior to execution of the variable value during the DXE phase of the second version BIOS image boot process, the location of Value D or the description of the location of Value D within the main memory 104 of the information handling system executing Value D may change prior to execution of the second version BIOS image boot process. As also described above, the MBR and El Torito partition formats may have completely different ways of organizing files and describing their locations within that organization. In such an embodiment, the processor may not be capable of locating Value D having a location described according to El Torito format within main memory 104 partitioned according to the MBR format, potentially resulting in an unrecoverable system failure. As also described above, if the first action the processor takes upon accessing the main memory 104 during the DXE phase is to repartition the memory, Value D that was stored in the memory at FV_NVRAM/V1/D may be immediately erased or corrupted. Thus, even though the variable update map 234 may provide a map to show where Value D is located in the memory prior to repartitioning, and a map to show where Value D should be located in the memory after repartitioning, Value D may be erased or corrupted before the processor can save Value D to the appropriate location according to the new partitioning format.

In both such embodiments, by retrieving Value D from the variable update map 234, storing Value D in the HOB 602 during the PEI phase of the boot process, and as a first step of the DXE process, storing Value D at the location FV_NVRAM/V2/D adhering to the El Torito format (rather than at FV_NVRAM/V1/D referring to the MBR format), when the processor executes the "GetVariable" call for Variable D during a later step in the DXE phase of the second version BIOS image boot process, the processor will go to FV_NVRAM/V2/D adhering to the current partition format and execute an uncorrupted copy of Value D. In such a way the automated UEFI variable update management system may avoid the scenario in which execution of the UEFI variables given in the second BIOS image requires repartitioning of the temporary memory, resulting in deletion and/or corruption of a necessary file prior to its execution.

Figure 7:
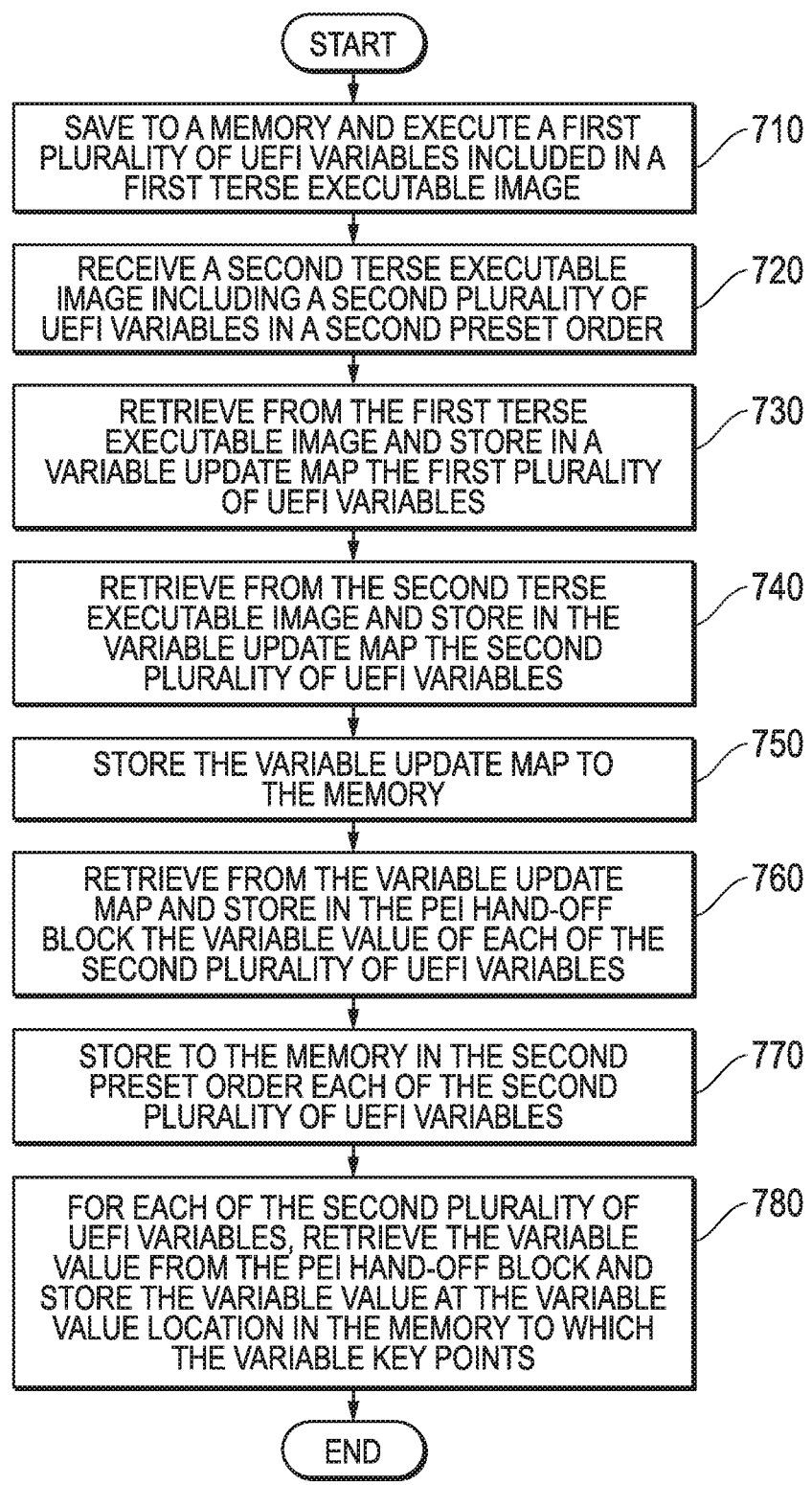
FIG. 7 is a flow diagram illustrating a method of operating an automated UEFI variable update management system according to an embodiment of the present disclosure.

FIG. 7 is a flow diagram illustrating a method of automatically managing an update of UEFI variables according to an embodiment of the present disclosure. At block 710, in an embodiment, a first plurality of UEFI variables included in a first terse executable image may be saved to a memory of an information handling system. In an embodiment, a first plurality of UEFI variables including Variable A, Variable B [8], Variable C, and Variable D may be included in a first version BIOS image, and each of these variables may be saved to a memory of an information handling system. The first version BIOS image may be saved (or "flashed") to the memory of an information handling system, and Variable A, Variable B [8], Variable C, and Variable D may be stored in the preset order dictated by the first version BIOS image to the main memory in an aspect. During the DXE phase of the BOOT process pertaining to the first version BIOS image, the processor in an embodiment may execute each of the code instructions associated with the UEFI variables A-D, as stored in the main memory of the information handling system, in the order in which they are placed in the first version BIOS image.

At block 720, in an embodiment, a second terse executable image including a second plurality of UEFI variables in a second preset order may be received by an information handling system. As described above, in an embodiment, a second plurality of UEFI variables including Variable A, Variable B [16], Variable D, Variable E, Variable F, and Variable G may be included in a preset order in a second version BIOS image received by the information handling system.

At block 730, in an embodiment, the first plurality of UEFI variables may be retrieved from the first terse executable image and stored in a variable update map. The automated UEFI variable update management system in an embodiment may generate a variable update map that records information pertaining to each UEFI variable listed in the first version BIOS image. As an example, the variable update map in an embodiment may identify each of the UEFI variables that were included in Version 1, including Variables A-D, may include the values Value A associated with Variable A, Value B[8] associated with Variable B [8], Value C associated with Variable C, and Value D associated with Variable D, and may also record the location in the memory of an information handling system executing the variable values of each UEFI variable in the variable update map in an aspect. The automated UEFI variable update management system in an embodiment may access the variable update map, retrieve the variable values for each of the UEFI variables from the first version BIOS image (Variables A-D), and may store each variable value at the variable value location (within the memory of the information handling system) with which it is associated in the variable update map.

At block 740, in an embodiment, the second plurality of UEFI variables may be retrieved from the second terse executable image and stored in the variable update map. The automated UEFI variable update management system in an embodiment may add to the variable update map information pertaining to each UEFI variable listed in the second version BIOS image. As an example, the variable update map in an embodiment may identify each of the UEFI variables that were included in Version 2, including Variables A, B[16], and D-G, may include the values Value A associated with Variable A, Value B[16] associated with Variable B [16], Value D associated with Variable D, Value E associated with Variable E, Value F associated with Variable F, and Value G associated with Variable G, and may also record the location in the memory of an information handling system executing the variable values of each UEFI variable in the variable update map. The automated UEFI variable update management system in an embodiment may access the variable update map, retrieve the variable values for each of the UEFI variables from the second version BIOS image (Variables A, B[16], and D-G), and may store each variable value at the variable value location (within the memory of the information handling system) with which it is associated in the variable update map.

At block 750, in an embodiment, the variable update map may be stored to the memory of the information handling system. In order to ensure an uncorrupted variable value is stored at the correctly formatted variable value location associated with that variable value in the second version BIOS image, the processor may store the variable update map to the main memory, for later use in the creation of hand-off blocks storing the correct values of each of the UEFI variables, as described below. In an embodiment, the variable update map may be stored in the memory of an information handling system. Storage of the UEFI variable included in the second version BIOS image and of the variable update map recording the variable value and the variable location for each UEFI variable given in each BIOS image version may allow the processor of the information handling system to later generate PEI hand-off blocks (HOBs) in order to manage proper storage of the correct and uncorrupted variables values for each UEFI variable within the computer memory prior to the DXE phase, and to ease the process of debugging if execution of the UEFI variables included in the second version BIOS image results in an unrecoverable system failure.

At block 760, in an embodiment, the variable value of each of the second plurality of UEFI variables may be retrieved from the variable update map and stored in a PEI hand-off block. As described above, during the PEI phase of the boot process, in an embodiment, the automated UEFI variable update management system may direct the processor of the information handling system executing the UEFI variables to retrieve the variable values associated with each of the UEFI variables included in the BIOS image version currently being executed from the variable update map stored in the information handling system memory, and store those variable values in a PEI hand-off block. The variable update map may have been stored in the main memory of the information handling system executing the UEFI variables associated with the second version BIOS image, including Variables A, B, D, E, F, and G. The variable update map in an embodiment may include the variable values Value A, Value B[16], Value D, Value E, Value F, and Value G, associated with Variables A, B, D, E, F, and G. As also described above, variable values Value A, Value B[16], Value D, Value E, Value F, and Value G, associated with Variables A, B, D, E, F, and G may be retrieved from the variable update map and stored in a PEI hand-off block (HOB).

At block 770, in an embodiment, the second plurality of UEFI variables may be stored to the memory in the second preset order. In an embodiment, a second plurality of UEFI variables including Variable A, Variable B [16], Variable D, Variable E, Variable F, and Variable G may be included in a preset order in a second version BIOS image received by the information handling system, and each of these variables may be saved to a memory of an information handling system. The second version BIOS image may be saved (or "flashed") to the memory of an information handling system, and Variable A, Variable B [16], Variable D, Variable E, Variable F, and Variable G may be stored in the preset order dictated by the second version BIOS image to the main memory in an aspect. During the DXE phase of the boot process, the processor may, beginning with Variable A stored in the main memory, execute each of the files associated with the list of UEFI variable stored in main memory, in the order in which they are stored, from top to bottom. In order for each of these executions to succeed, and in order to avoid an unrecoverable system failure, the files or variable values associated with each of these UEFI variables must be stored in the location of the main memory to which the processor is pointed with the "GetVariable" command, and each file must be uncorrupted. In order to ensure an uncorrupted variable value is stored at the correctly formatted variable value location associated with that variable value in the second version BIOS image, the processor may store a variable update map to the main memory, for later use in the creation of hand-off blocks storing the correct values of each of the UEFI variables, as described below.

At block 780, in an embodiment, for each of the second plurality of UEFI variables, the variable value may be retrieved from the PEI hand-off block and stored at the variable value location in the memory of the information handling system to which the variable key points. As the first step of the DXE phase of the second version BIOS image boot process, the automated UEFI variable update management system in an embodiment may direct the processor of the information handling system executing the UEFI variables to retrieve the variable value locations associated with each of the UEFI variables included in the BIOS image version currently being executed from the variable update map stored in the information handling system memory, and store the corresponding variable values previously stored in a PEI hand-off block to each of these variable value locations within the memory of the information handling system. For example, the variable update map may include the variable values locations FV_NVRAM/V2/A, FV_NVRAM/V2/B[16], FV_NVRAM/V2/D, FV_NVRAM/V2/E, FV_NVRAM/V2/F, and FV_NVRAM/V2/G, associated with Variables A, B, D, E, F, and G. In an embodiment, the variable values Value A, Value B[16], Value D, Value E, Value F, and Value G, associated with Variables A, B, D, E, F, and G may be retrieved from the HOB, and each of those respective variable values may be stored at the respective variable value locations FV_NVRAM/V2/A, FV_NVRAM/V2/B[16], FV_NVRAM/V2/D, FV_NVRAM/V2/E, FV_NVRAM/V2/F, and FV_NVRAM/V2/G within the main memory of the information handling system.

The blocks of the flow diagrams discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating an automated Unified Extensible Firmware Interface (UEFI) variable update management system comprising a first processor executing machine-readable executable code instructions of the automated UEFI variable update management system to:
    generate a first terse executable image identifying a first version number and including a first plurality of UEFI variables executable in a first preset order with respect to basic input output operating system (BIOS), wherein a remote information handling system has previously executed the first plurality of UEFI variables;
    generate a second terse executable image identifying a second version number and including a second plurality of UEFI variables executable in a second preset order with respect to BIOS;
    each of the first plurality of UEFI variables and the second plurality of UEFI variables including a variable value, and a variable key pointing to a variable value location in a memory of the remote information handling system;
    retrieve from the first terse executable image and store in a variable update map the first plurality of UEFI variables;
    retrieve from the second terse executable image and store in the variable update map the second plurality of UEFI variables;
    wherein the variable update map associates each of the first plurality of UEFI variables with the first version number, and each of the second plurality of UEFI variables with the second version number; and
    transmit to the remote information handling system the variable update map and the second terse executable image.

2. The information handling system operating the automated UEFI variable update management system of claim 1, wherein the variable update map further includes machine-readable executable code instructions for the processor of the remote information handling system to:
    save the second terse executable image to the memory;
    retrieve from the variable update map and store in a pre-EFI initialization (PEI) hand-off block the variable value of each of the second plurality of UEFI variables;
    for each of the second plurality of UEFI variables, retrieve the variable value from the PEI hand-off block and store the variable value at the variable value location in the memory to which the variable key points; and
    store the variable update map in the memory of the remote information handling system.

3. The information handling system operating the automated UEFI variable update management system of claim 1, wherein the variable value locations of the first plurality of UEFI variables adheres to a first partition format, the variable value locations of the second plurality of UEFI variables adheres to a second partition format, and the first and second partition formats do not match.

4. The information handling system operating the automated UEFI variable update management system of claim 1 wherein the memory of the remote information handling system is a read/writeable non-volatile random access memory.

5. The information handling system operating the automated UEFI variable update management system of claim 1 wherein the memory of the remote information handling system is a readable but not writeable non-volatile random access memory.

6. The information handling system operating the automated UEFI variable update management system of claim 1 wherein the first preset order and the second preset order do not have a fixed size.

7. The information handling system operating the automated UEFI variable update management system of claim 1 wherein the variable value of one of the second plurality of UEFI variables not included in the first plurality of UEFI variables is a default value.

8. An information handling system operating an automated Unified Extensible Firmware Interface (UEFI) variable update management system comprising a processor executing machine-readable executable code instructions of the automated UEFI variable update management system to:
    save to a memory and execute a first plurality of UEFI variables in a first preset order with respect to basic input output operating system (BIOS) included in a first terse executable image;
    receive a second terse executable image including a second plurality of UEFI variables executable in a second preset order with respect to BIOS;
    each of the first plurality of UEFI variables and the second plurality of UEFI variables including a variable value, and a variable key pointing to a variable value location in the memory;
    retrieve from the first terse executable image and store in a variable update map the first plurality of UEFI variables;
    retrieve from the second terse executable image and store in the variable update map the second plurality of UEFI variables; and
    store the variable update map to the memory.

9. The information handling system operating the automated UEFI variable update management system of claim 8, wherein the processor further executes machine-readable executable code instructions of the automated UEFI variable update management system to:
    retrieve from the variable update map and store in the pre-EFI initialization (PEI) hand-off block the variable value of each of the second plurality of UEFI variables;
    store to the memory in the second preset order each of the second plurality of UEFI variables; and
    for each of the second plurality of UEFI variables, retrieve the variable value from the PEI hand-off block and store the variable value at the variable value location in the memory to which the variable key points.

10. The information handling system operating the automated UEFI variable update management system of claim 8, wherein the variable value locations of the first plurality of UEFI variables adheres to a first partition format, the variable value locations of the second plurality of UEFI variables adheres to a second partition format, and the first and second partition formats do not match.

11. The information handling system operating the automated UEFI variable update management system of claim 8 wherein the memory of the information handling system is a read/writeable non-volatile random access memory.

12. The information handling system operating the automated UEFI variable update management system of claim 8 wherein the memory is a readable, but not writeable non-volatile random access memory.

13. The information handling system operating the automated UEFI variable update management system of claim 8 wherein the first preset order and the second preset order do not have a fixed size.

14. The information handling system operating the automated UEFI variable update management system of claim 8 wherein the variable value of one of the second plurality of UEFI variables not included in the first plurality of UEFI variables is a default value.

15. A method for automatically managing updated Unified Extensible Firmware Interface (UEFI) variables comprising:
    saving to a memory and executing a first plurality of UEFI variables included in a first terse executable image executable in a first preset order with respect to basic input output operating system (BIOS);
    receiving a second terse executable image including a second plurality of UEFI variables executable in a second preset order with respect to BIOS;
    wherein each of the first plurality of UEFI variables and the second plurality of UEFI variables includes a variable value, and a variable key pointing to a variable value location in the memory;
    retrieving from the first terse executable image and storing in a variable update map the first plurality of UEFI variables;
    retrieving from the second terse executable image and storing in the variable update map the second plurality of UEFI variables; and
    storing the variable update map to the memory.

16. The method for automatically managing updated UEFI variables of claim 15, further comprising:
    retrieving from the variable update map and storing in the pre-EFI initialization (PEI) hand-off block the variable value of each of the second plurality of UEFI variables;
    storing to the memory in the second preset order each of the second plurality of UEFI variables; and
    for each of the second plurality of UEFI variables, retrieving the variable value from the PEI hand-off block and storing the variable value at the variable value location in the memory to which the variable key points.

17. The method for automatically managing updated UEFI variables of claim 15, wherein the variable value locations of the first plurality of UEFI variables adheres to a first partition format, the variable value locations of the second plurality of UEFI variables adheres to a second partition format, and the first and second partition formats do not match.

18. The method for automatically managing updated UEFI variables of claim 15 wherein the memory of the information handling system is a read/writeable non-volatile random access memory.

19. The method for automatically managing updated UEFI variables of claim 15, wherein the memory is a readable, but not writeable non-volatile random access memory.

20. The method for automatically managing updated UEFI variables of claim 15, wherein the first preset order and the second preset order do not have a fixed size.

* * * * *